June 21, 1960   E. C. JERTSON   2,941,344
MARINE HARVESTER COMPRISING A CHAIN RAKE
Filed July 12, 1957   6 Sheets-Sheet 1

INVENTOR.
EARL C. JERTSON
BY
ATTORNEY

June 21, 1960    E. C. JERTSON    2,941,344
MARINE HARVESTER COMPRISING A CHAIN RAKE
Filed July 12, 1957    6 Sheets-Sheet 2
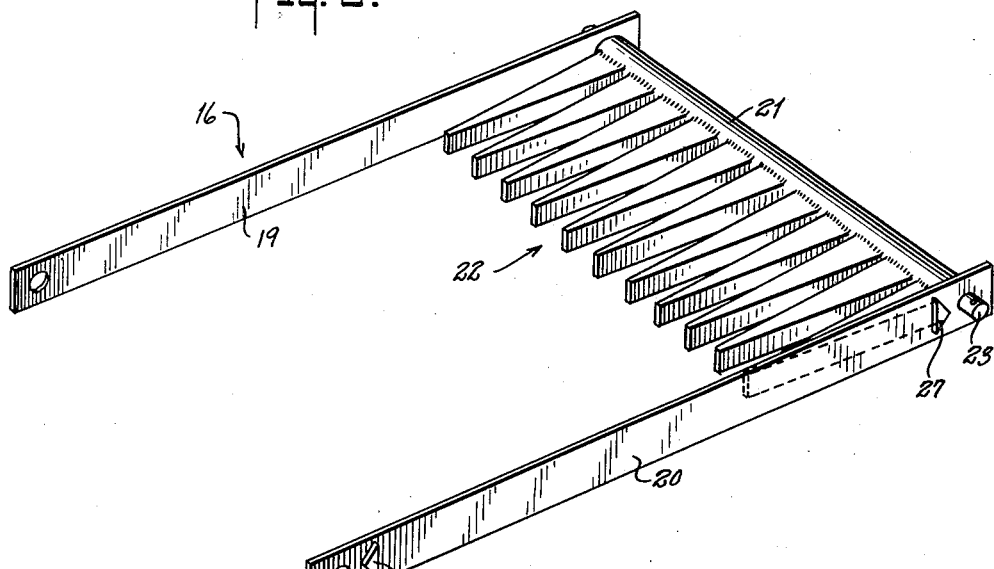
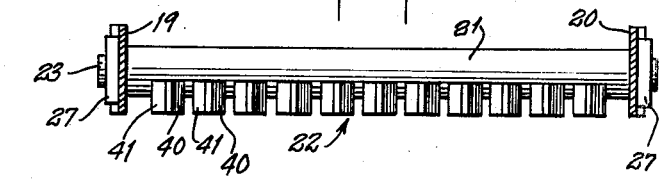
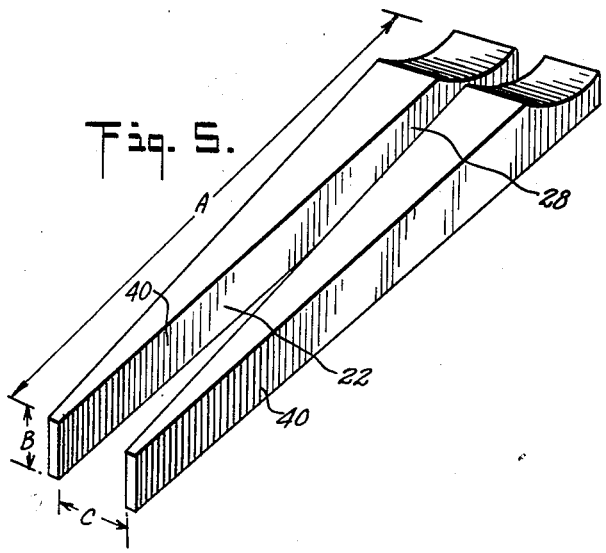
INVENTOR.
EARL C. JERTSON
BY
ATTORNEY June 21, 1960

E. C. JERTSON 2,941,344

MARINE HARVESTER COMPRISING A CHAIN RAKE

Filed July 12, 1957

INVENTOR.
EARL C. JERTSON
BY
ATTORNEY

INVENTOR.
EARL C. JERTSON
BY
ATTORNEY

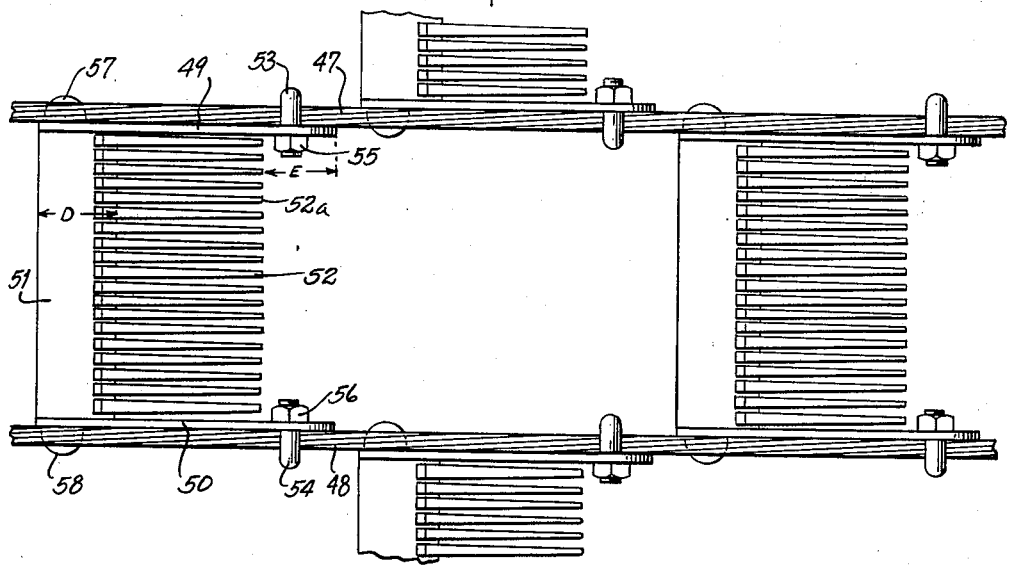
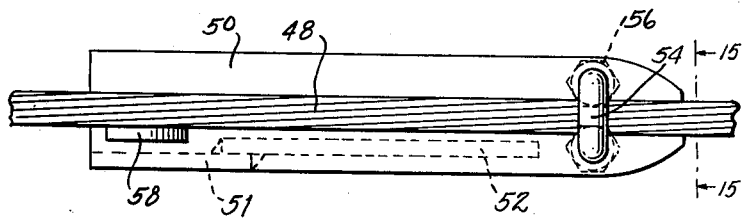
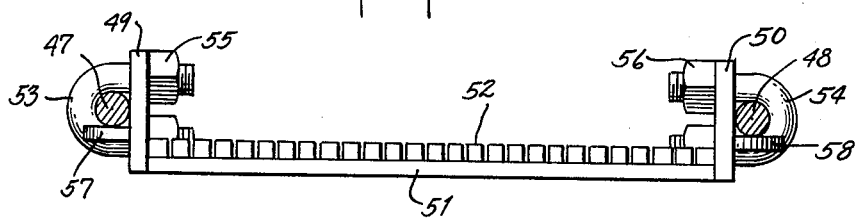

June 21, 1960   E. C. JERTSON   2,941,344
MARINE HARVESTER COMPRISING A CHAIN RAKE
Filed July 12, 1957   6 Sheets-Sheet 6
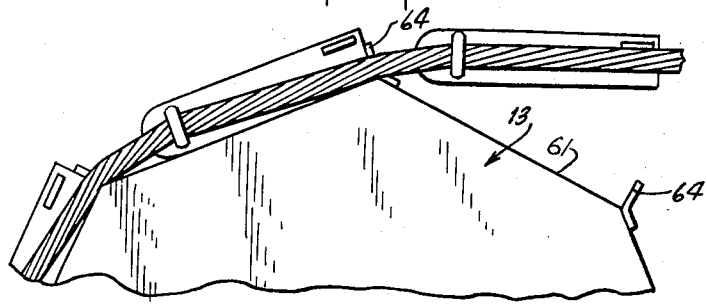
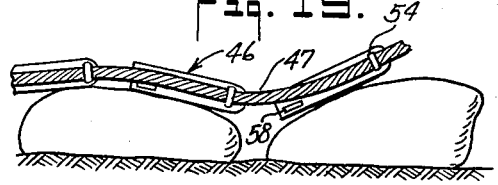
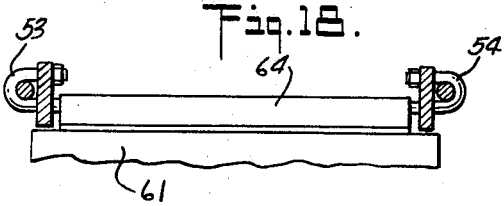
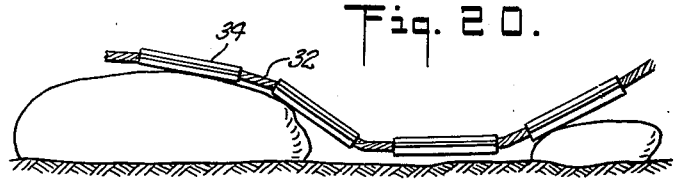
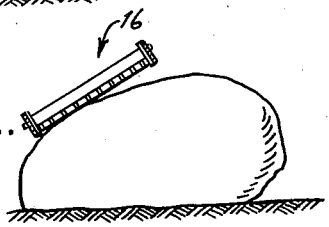
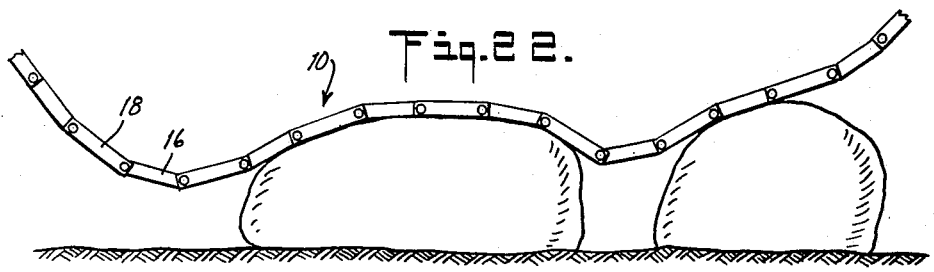
INVENTOR.
EARL C. JERTSON
BY
ATTORNEY

# United States Patent Office 2,941,344
Patented June 21, 1960

2,941,344

MARINE HARVESTER COMPRISING A CHAIN RAKE

Earl C. Jertson, Fairhaven, Mass., assignor to Marine Colloid, Inc., a corporation of Delaware Filed July 12, 1957, Ser. No. 671,613

7 Claims. (Cl. 56—9)

This invention relates to apparatus for harvesting seaweed and is directed particularly to harvesting means for removing seaweed from the bottom of the sea. The invention is particularly applicable to the harvesting of Irish moss.

Irish moss is an alga having a single stalk which attaches itself to the surface of a rock by a disc-like holdfast. The stalk divides repeatedly to form a bushy head. The body of the plant is tough and resilient. The overall length of the Irish moss is generally between three and five inches, with the branching occurring at approximately one to three inches from the attaching portion of the stalk. Since the Irish moss must secure itself to a firm foundation, it will grow only on a rocky bottom and not on a sandy bottom. Thus, the Irish moss is found on the ocean floor where there are rocks ranging from a few inches to many feet in diameter, and along rocky ledges. Irish moss cannot be exposed to air for any extended length of time and, therefore, it grows in water from an ebb tide level to approximately a 25 or 30 foot depth. Therefore, the moss must be harvested below the surface of the water, usually at depths from two to twenty-five feet. In addition, other marine life such as crabs, lobsters, etc., find shelter in the growths of moss and care must be taken not to injure these during the harvesting of the moss.

Any harvester must be readily adaptable to wide variations in depth and capable of moving over large rocks and boulders having rounded or jagged edges. Heretofore, no mechanical harvesting equipment has been developed that could commercially harvest Irish moss. As of this date, the primary means of securing Irish moss is by hand raking.

The primary object of this invention is to provide a harvester for gathering large quantities of seaweed and, in particular, Irish moss. Other objects and advantages of this invention will become apparent from the following description taken in connection with the drawings in which:

Fig. 1 schematically illustrates the harvesting apparatus mounted on a boat;

Fig. 3 illustrates the rake member;

Fig. 4 is a sectional view of the rake member taken along line 4—4 of Fig. 2;

Figs. 5 and 6 are enlarged fragmentary views of the prongs of the rake shown in Fig. 3;

Fig. 14 is an enlarged side view of a preferred embodiment shown in Fig. 16;

Fig. 15 is a sectional view taken along lines 15—15 of Fig. 14;

Fig. 16 is a top view of a rake with a plurality of rows of rakes as illustrated in Figs. 14 and 15;

Figs. 17 and 18 illustrate the driving of a chain rake with a single row of rakes; in Fig. 18 the side pieces are shown in section; and Figs. 19—22 illustrate various possible positions of the harvester on the sea bottom.

Figure 1:
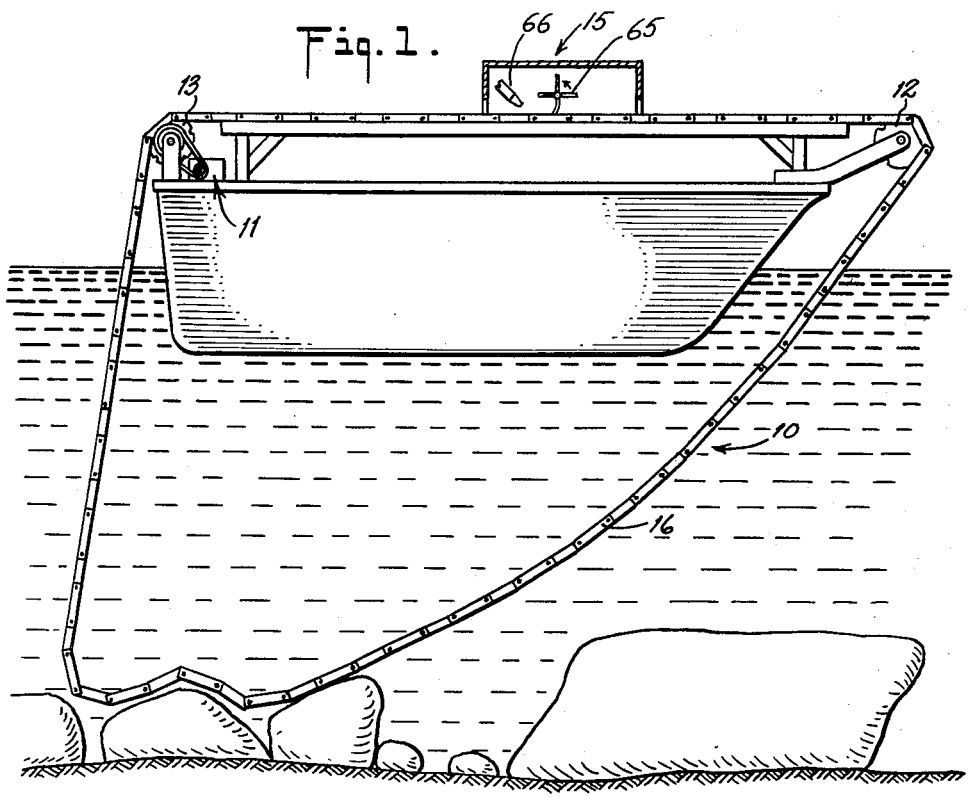
Figure 2:
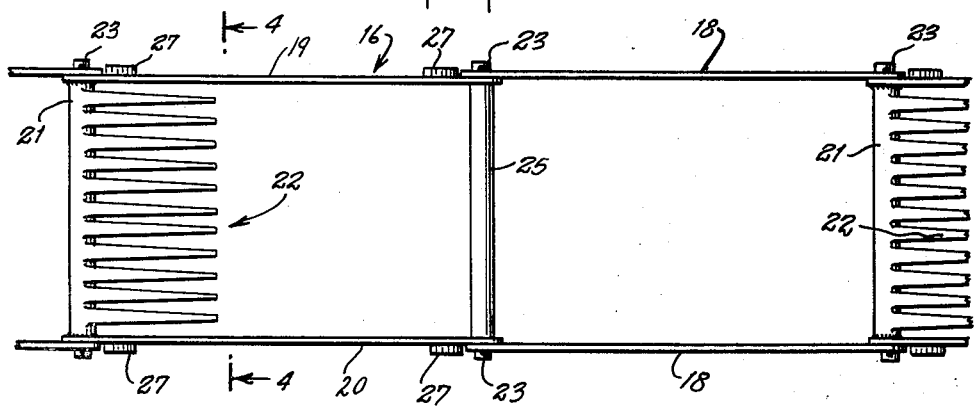
Fig. 2 illustrates a bottom view of a portion of the chain.

The harvester essentially comprises an endless chain 10 of limited flexibility suspended from the bow and stern of a boat to lie in a generally lengthwise direction along the sea bottom. The chain is moved slowly along the bottom by the movement of the boat and by a chain drive mechanism 11. The flexibility of the chain permits it to conform generally to the contour of the bottom, and to drag along the bottom to gather the seaweed or Irish moss which it then carries up onto the deck of the boat for removal by a suitable means. The chain driving mechanism 11 is preferably connected to the stern sprocket wheel 13 to maintain the chain under tension along the deck of the boat and along the bottom of the sea. After the chain is cleaned, it is passed over the stern sprocket wheel and dropped down to the sea bottom where it gathers further seaweed or moss. The sprocket wheel 12, supporting the chain at the bow of the boat, may be pivotally mounted so that the chain may be readily raised clear of the sea bottom when not in use.

The chain 10, as illustrated in Figs. 2–6, comprises a plurality of rake or harvesting members 16 coupled together by links 18. Each rake member comprises two flat side pieces or members 19 and 20 and a tubular cross piece or transverse member 21 rigidly secured to the side pieces to hold the side pieces in parallel relation to one another and in fixed relation to the cross piece. A row of tines or prongs 22 is rigidly secured to the cross piece 21 and extends between the side pieces 19 and 20 with the bottom of the tines above the bottom surfaces of the side pieces which form runners for dragging the rake member along the bottom. The side pieces are preferably longer than the tines or prongs and extend forwardly of the ends of the tines to precede the tines and provide a guide means over the bottom. In the link form, the cross piece 21 or spacer 25 is combined with the side pieces to form the guide means to assist in preventing the tines from snaring on unyielding objects.

The rake members are coupled together by the links 18 which are connected to the rake members by transverse pins 23 extending through the ends of the side pieces 19 and 20 and secured in place by cotter pins. A spacer member 25 fits between the open ends of the side pieces 19 and 20 to maintain the spacing of the ends and provide transverse rigidity to the chain. The links are thus pivotally linked to the rake members to form a flexible chain. The flexibility of the chain is limited in this embodiment by stop means 27 mounted on the same side of the side pieces as the links 18. In Figs. 3, 5 and 6 a triangular shaped stop 27 is mounted with edges at an angle for engaging the end of the connecting member. It is preferable that the length of the link and the angle of the edges of the stop be such as to limit the minimum size or diameter of the loop formed. The minimum size or diameter is not critical, but it should be large enough to prevent the chain from looping over and snaring in itself as it passes over the irregular sea bottom. In a particular embodiment a minimum loop of approximately three feet diameter functions in a satisfactory manner.

In considering the rake member in greater detail, reference is made to Figs. 3, 4, 5 and 6 in which a form of the prongs 22 is clearly illustrated. In this form the prongs 22 have a length A and a thickness B. The prongs are tapered so that the distance C at the free end is greater than at the base of the prongs. The space between the prongs is V-shaped in order to readily comb through the Irish moss and collect it at the base of the space 28. The prongs 22 have side surfaces 40 and 41 which preferably have a substantial width to provide a firm gripping surface for holding the branched portion of the Irish moss. The function of the surfaces is to hold and grip the Irish moss rather than to cut or sever it.

In the harvesting action, the rake member moves generally parallel to the surface on which the harvesting action occurs, with the runners sliding along in engagement therewith. The tines 22 are recessed between the side pieces 19 and 20 and preferably have the bottom of the tines adjacent to or in the plane through the surface of the runners. The tines slide between the surface of the rock and the branched portion of the Irish moss. The moss is tilted over and the branched portion drawn between the tines against the side surfaces. The moss becomes wedged between the surface of the tines and is pulled loose from the rock. A number of clusters of Irish moss are caught in the space between adjacent tines before the space becomes full. The moss is thus securely gripped for conveyance to the deck of the boat by the tines or prongs which form a means for gathering and weighing the moss.

Figure 7:
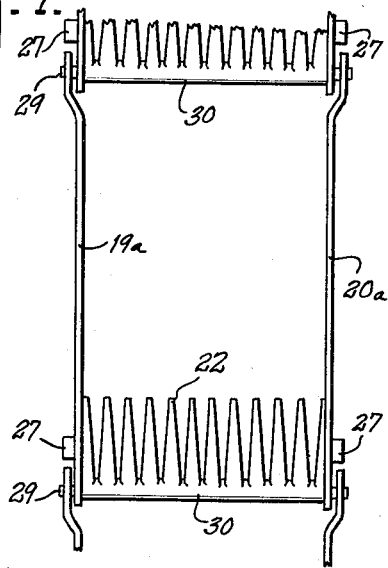
Fig. 7 illustrates another embodiment of the link-type rake.
Figure 9:
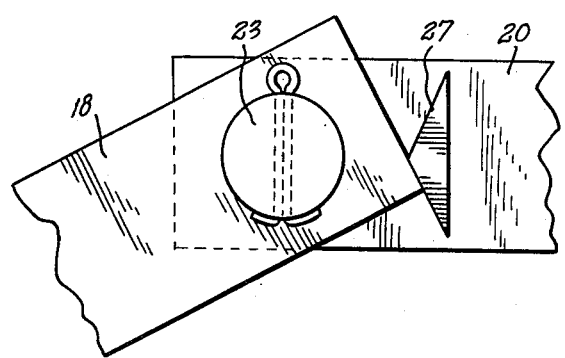
Fig. 9 illustrates an enlarged portion of the chain shown in Figs. 2 and 7 at the limit of its bendability.
Figure 8:
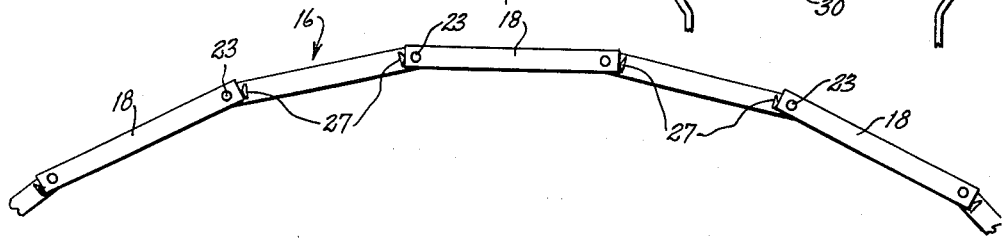
Fig. 8 is a fragmentary view of the chain illustrating the flexibility stop.

A modification of the foregoing embodiment is illustrated in Fig. 7 in which the rake members are directly pivoted together by the side pieces 19a and 20a. The ends of the side pieces are shaped to fit on the outside of the side pieces or a preceding link. A rod 29 extends through the tubular member 30 to pivotally link the rake members together and stops 27 are provided as described in the previous embodiment to limit the flexibility of the chain.

The runners of the rake member and the connecting links present generally even surfaces with no abrupt uneven projections. The tines are recessed between the side pieces to avoid snaring on sharp projections. The short side pieces 19 and 20 and the connecting links 18 pivotally linked to the side pieces permit the chain to conform incrementally to the bottom of the sea. In the embodiment of Fig. 7 the connecting links 18 are substituted by rake- or tine-bearing links to provide each link with a set of tines, thereby increasing the harvesting capacity of the chain.

Each rake member moves in a generally parallel relation to the sea bottom or boulder over which it is moving. The free flexibility within the given limits of the connections of the links and rake members readily permits the chain to conform to the contours of the bottom over which it is moving. The combined movement of the boat and the chain lays the preceding links or rake members on the surface and then drags the succeeding members. Thus, the preceding links lead or guide the succeeding members, and under the pulling action of the sprocket wheel 13 draw the succeeding member over any sharp obstacles. The ease of flexibility of the links permits the chain to adapt itself readily to sharp variations in the contour of the bottom. The limits of this flexibility limit the maximum flexure of the chain when too sharp a change occurs in the level of the sea bottom. This limitation in flexibility permits the chain to adjust itself from one level to another. When working under such circumstances, the harvesting action of the chain ceases, but it prevents a doubling back or looping of the chain which would disrupt the harvesting of the seaweed entirely until the chain could be disentangled. On a sharp change in the level of the sea bottom, the chain tends to festoon itself in rounded loops.

The invention may be utilized in other embodiments. Instead of individual linkages, continuous stranded rope or cable is preferably used to connect the rakes, as illustrated in Figs. 10–16. Two cables may be used to form a harvesting chain of a single row of rake members, or the harvesting chain may be widened by providing three or more cables with rake members between the cables to form a plurality of rows of rake members. The multiple row of rake members is best illustrated in Figs. 12 and 16, in which fragmentary views of three cables 31, 32, 33, are illustrated with four rows of rake members.

The plural rows of rake members provide a lateral flexibility to the chain so that the chain conforms laterally to the sea bottom. Each row of rake members moves along in a generally parallel relation to the immediate portion of the sea bottom being harvested. Thus the plural row harvester rakes over the rocks and boulders to remove the Irish moss.

Figure 10:
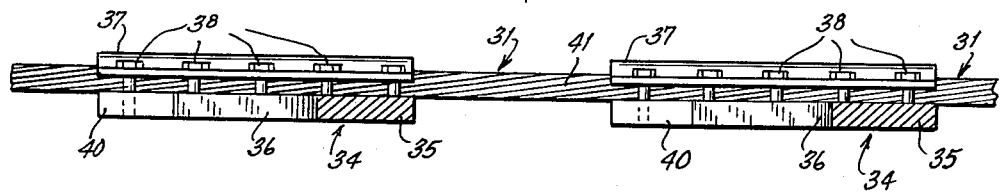
Fig. 10 illustrates an embodiment in which the individual rakes are connected by a stranded cable with the cross piece shown in section.
Figure 11:
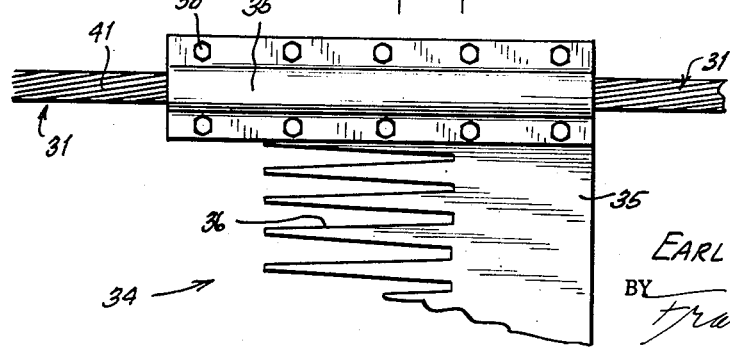
Fig. 11 is an enlarged fragmentary top view of the embodiment of Fig. 10.
Figure 12:
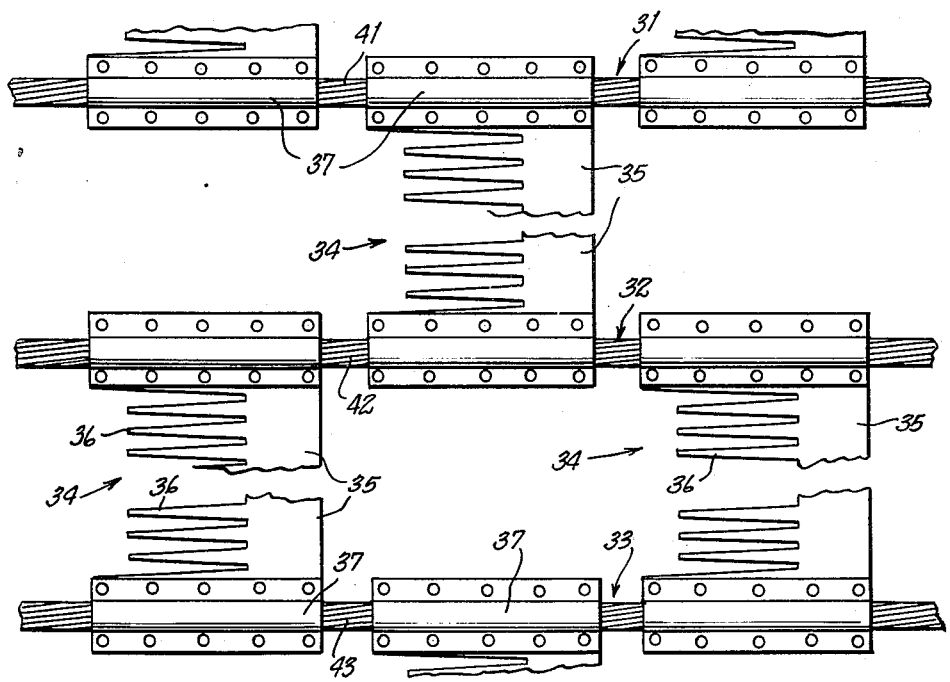
Fig. 12 is a top view of an embodiment with a plurality of rows of rake members.

In Figs. 10 and 11, a single row chain is illustrated. The rake member 34 is stamped from a steel plate forming the cross piece 35 and prongs or tines 36 integral with the piece. The prongs 36 are the same shape as the prongs 22.

The rake members may be secured to the cable in various suitable ways. As illustrated, clamp plates 37, bolts 38 threaded in the cross piece and runners 40 may be used, but for the purposes of economy U-shaped bolts may be used passing through the rake member and secured by nuts threaded thereon. The rake members are securely fastened to the cables so as not to slide along the cables but remain in position. The runner 40 is longer than the prongs 36 so that the runners on each side of the rake member preset the prongs and guide the prongs over variations in the sea bottom.

Figure 13:
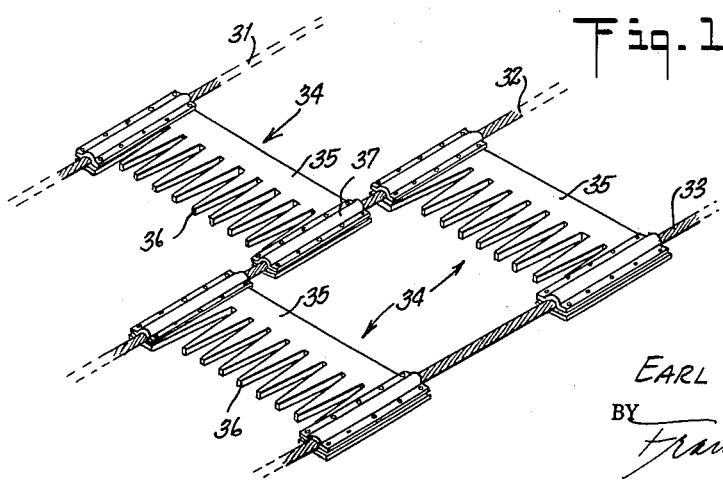
Fig. 13 is a perspective view of the embodiment of Fig. 12.

In Figs. 12 and 13, a harvesting chain having a plurality of rows of rake members is shown. The rake members of one row are spaced by the rake members of an adjacent row. The runners secured to a given cable are spaced to provide portions 41, 42 and 43 on the respective cables to permit the cable to flex freely and provide the harvesting chain with a limited longitudinal bendability. The degree of flexure is dependent on the inherent flexibility of the free portions.

The plural row harvester has a limited lateral bendability due to the torsional flexibility of the cable. The degree of twist depends also on the inherent characteristic of the cable and the length of the cable between the rake members. Thus the harvester can conform to the contours of the bottom.

The plural row harvester may have a greater longitudinal flexibility than a single row harvester. The greater width of the plural row harvester reduces the possibility of the harvester chain looping back on itself and catching. With the greater width, the chain will tend to form folds or rows that straighten when the harvester moves to a level portion of the sea bottom.

In Figs. 14–16, another embodiment of the invention is clearly illustrated, in which the rake members 46 are flexibly connected by stranded cables 47, 48. These rake members comprise side pieces 49, 50, cross piece 51, and tines or prongs 52. The cross piece 51 and the side pieces 49, 50 are welded together as illustrated, with the cross piece preferably perpendicular to the side pieces. The side pieces and the cross pieces are made from iron or steel plate and are of sufficient thickness to provide rigidity and strength to the rake member. The cross piece has a width D of a dimension to prevent buckling or twisting of the cross piece.

The prongs 52 may be formed as a single piece with the cross piece 51, or they may be formed separately and welded to the cross pieces, as best illustrated in Fig. 14. The prongs 52, as in the other embodiments, are recessed between the side pieces and preferably have a length so that the ends 52a are spaced from the end of the side pieces by a distance E. Thus, the prongs and side pieces form a unitary member with the side pieces leading the prongs as the rake member is drawn across the sea bottom. These leading side pieces form guide means for preventing the entry of projections between the tines.

As illustrated in this embodiment, and applicable to the previously described embodiments, the leading edges of the side pieces are preferably rounded to minimize the possibility of snaring of the rake members on sharp irregularities on the bottom and reduce the drag of the chain rake on the bottom.

This embodiment differs essentially from the previous embodiments in the means for securing the rake members to the stranded cable. The rake members are attached to the forward portions of the side pieces 49, 50 so that the rake member can pivot or flex, in relation to the cable, about the connecting means. The connecting means may be U-shaped bolts 53, 54 fitting around the respective cables 47, 48 and secured to the side pieces by nuts 55, 56. The bolts and nuts securely fasten the side pieces to the cable so that the rake members are fixed in place along the stranded cable and retain their positions in relation to one another. The swinging action of the rake member in relation to the cables is limited by stops or lifts 57 and 58. The stops or lifts are welded to the side pieces and extend perpendicular thereto, as best illustrated in Fig. 15. The stops or lifts limit the pivotal or swinging action of the rake member to one side of the wire rope. If the rake member swings or tilts downward, the lifts engage the cable and lift the forward end of the following rake member of a single lane chain rake, or the following rake members of the adjacent lanes of a chain rake having a plurality of lanes. Thus, the stops or lifts maintain the prongs 22 generally parallel to the surface over which the rake member is moving or permit the ends of the prongs to be raised at an angle to the surface. In addition, they prevent the prongs from tilting downward and catching on projections on the bottom. Thus the rake moves over boulders, rocks and ledges without snaring or catching and stopping the harvesting action.

In Figs. 19 through 22, general illustrations of the action of the harvesting chain are shown. In Fig. 19 the lateral bending of the plural cable chain is illustrated to fit the chain between the sides of two boulders. In Fig. 21, a similar sloping of the link chain is shown to move along the sloped side of a boulder. In Figs. 20 and 22, the longitudinal conforming of the chain is illustrated. In Fig. 20, a double cable chain is illustrated, and in Fig. 22 the link chain is illustrated. It will be noted in each of these embodiments that the limiting of the flexure of the chain permits a bridging from one boulder to the next without the chain folding, thus preventing the formation of kinks or loops.

The sprocket wheel 13 is driven by a suitable prime mover to pull the chain rake. In Figs. 17 and 18 a sprocket wheel for driving a single lane chain rake is illustrated. In this embodiment the sprocket wheel is preferably formed with a drum surface 61 with longitudinally extending teeth 64 for engaging the rear edges of the cross pieces of the rake members. The teeth are circumferentially spaced to correspond to the distance between the rake members so that each rake member is engaged by the sprocket wheel to move the harvesting chain. The harvesting chain is preferably supported on the deck of a boat by a trough 14 extending the length of the boat. At a suitable location, means may be provided for removing the moss from the prongs 22. An effective method is a rotating brush, which brushes the moss out of the open ends between the prongs.

In Fig. 1 a cleaning means 15 is illustrated comprising a plurality of radially extending brushes 65 rotatably mounted and driven by a suitable driving means (not shown). The brushes may be made of wire or flexible pieces of rubber or plastic and are rotated at a high speed so that each rake member is brushed a number of times as it is drawn through the cleaning means. The brushes move in a direction outwardly from the base of the prongs to push or force the caught seaweed or Irish moss from between the prongs. Since the seaweed and the moss are of a tenacious, tough nature, they respond to the brushing action without disintegrating and are readily removed by the brushes. A flow of sea water may be provided against the rakes by a nozzle 66 or similar means to assist in the cleaning action and to wash the removed seaweed or moss from the cleaning station into a net or screen (not shown). With the prongs extending parallel and recessed between the side members, the bottom of the harvesting chain presents a surface without projections, so that the chain may be easily moved through the cleaning means. Thus, the form of the rake member provides an easy means of removing the moss from the boulders and rocks on the sea bottom, and also an easy means of removing it from the rakes after it is carried onto the deck of the boat.

It is thus seen that a mass harvesting of Irish moss can be accomplished by a harvester capable of harvesting on an extremely irregular sea bottom without snaring on the bottom. In addition, the movement of the chain across the bottom does not injure other marine life. Crabs, lobster, etc. can easily disengage themselves from the chain and move out of its path.

I claim:

1. A marine harvester comprising a pair of flexible stranded cables, a plurality of rake members arranged in a row and secured to said cables for dragging said members along the bottom of the sea, each rake member comprising spaced side pieces and a cross piece between said side pieces, said cross piece having a row of prongs recessed between said side pieces and having spaced ends and slots between the prongs for gathering the marine growth as the stranded cables and rake members are drawn along the bottom of the sea.

2. A marine harvester as set forth in claim 1 wherein said rake members are secured to said cables for a distance along said cables to securely fasten said members to the cables and said rake members are spaced from adjacent members along the cables to provide a flexible coupling between successive rake members.

3. A marine harvester as set forth in claim 1 wherein said rake members have forward portions and said rake members are secured to the cables at the forward portions to flexibly mount said rake members on said cables.

4. A marine harvester as set forth in claim 3 wherein stop means are provided to limit the movement of each rake to one side of said cables.

5. A marine harvester comprising a plurality of harvesting members, means connecting said members in series forming a continuous flexible chain of members, means supporting said chain at spaced points above the surface of the water and extending downward for movement in contact with the bottom of the sea, each harvesting member having substantially straight side members and a transverse member extending between said side members adjacent the rearward ends of said side members and secured thereto with said side members and said transverse member substantially in the same plane, a plurality of generally parallel tines secured in position between said side members and substantially in said plane with a free space in front of the forward ends of said tines, said tines being adapted for gripping sea growths between the sides thereof, and means securing at least the forward ends of said side members to said connecting means with said forward ends of said side members in substantially the same plane as that of said connecting means where said forward ends of said side members are secured thereto.

6. A marine harvester comprising a plurality of harvesting members, means connecting said members in series forming a continuous flexible chain, each of said harvesting members comprising side members having at least their forward ends secured to said connecting means in substantial alignment therewith, a transverse member extending between said side members adjacent the rearward ends of said side members, a plurality of generally parallel tines extending forwardly from said transverse member between said side members, and means holding said side members, said transverse member and said tines in substantially the same plane, said tines in successive harvesting members of said series having a free zone in front of the forward ends thereof and extending in the same direction for gathering sea growths upon the forward movement of said members relative to the bottom of the sea.

7. A marine harvester comprising a first series of harvesting members, means connecting said harvesting members of said first series in the form of a continuous flexible chain, a second series of harvesting members in parallel contiguous relation to said first series, means connecting said harvesting members of said second series in the form of a continuous flexible chain of members, means flexibly connecting said first and second series together for lateral flexure as between harvesting members of said first series that are in contiguous relation with harvesting members of said second series, each of said harvesting members of said first and of said second series comprising substantially straight side members having at least their forward ends secured to said connecting means in substantial alignment, a transverse member extending between said members adjacent the rearward ends thereof, a plurality of generally parallel tines extending between said side members and means holding said side members, said transverse member and said tines substantially in the same plane with a free zone in front of the forward ends of said tines, said tines of said harvesting members extending in the same direction for gathering sea growths upon the forward movement of said members relative to the bottom of the sea.

References Cited in the file of this patent

UNITED STATES PATENTS

| | | |
|---|---|---|
| 1,713,739 | Callahan | May 21, 1929 |
| 2,376,260 | Lobdell | May 15, 1945 |

FOREIGN PATENTS

| | | |
|---|---|---|
| 690,275 | Great Britain | Apr. 15, 1953 |